(12) United States Patent
Cabecinhas et al.

(10) Patent No.: US 11,468,502 B2
(45) Date of Patent: Oct. 11, 2022

(54) CUSTOMER PERSONALISED CONTROL UNIT, SYSTEM AND METHOD

(71) Applicant: OCADO INNOVATION LIMITED, Hatfield (GB)

(72) Inventors: Andreia Cabecinhas, Hatfield (GB); Jose Jimenez, Hatfield (GB); Clifford Bailey, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 61 days.

(21) Appl. No.: 16/968,363

(22) PCT Filed: Feb. 8, 2019

(86) PCT No.: PCT/EP2019/053123
§ 371 (c)(1),
(2) Date: Aug. 7, 2020

(87) PCT Pub. No.: WO2019/154981
PCT Pub. Date: Aug. 15, 2019

(65) Prior Publication Data
US 2021/0035199 A1 Feb. 4, 2021

(30) Foreign Application Priority Data
Feb. 9, 2018 (GB) ..................... 1802110

(51) Int. Cl.
*G06Q 30/00* (2012.01)
*G06Q 30/06* (2012.01)
*G06Q 30/02* (2012.01)
*G06N 7/00* (2006.01)

(52) U.S. Cl.
CPC ..... *G06Q 30/0643* (2013.01); *G06Q 30/0255* (2013.01); *G06Q 30/0627* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 9,916,541 | B2 | 3/2018 | Katsuki et al. |
| 9,947,024 | B1* | 4/2018 | Shariff ............... G06Q 30/0256 |
| 10,255,560 | B2 | 4/2019 | Katsuki et al. |
| 10,467,546 | B2 | 11/2019 | Katsuki et al. |

(Continued)

FOREIGN PATENT DOCUMENTS

| | | |
|---|---|---|
| CN | 107437200 A | 12/2017 |
| JP | 2015041121 A | 3/2015 |
| JP | 2016045642 A | 4/2016 |

OTHER PUBLICATIONS

Cam Davidson-Pilon, "How Shopify Merchants can Measure Retention" Nov. 14, 2017. Retrieved from https://shopify.engineering/how-shopify-merchants-can-measure-retention (Year: 2017).*

(Continued)

*Primary Examiner* — Naeem U Haq
(74) *Attorney, Agent, or Firm* — Buchanan Ingersoll & Rooney PC

(57) ABSTRACT

There is provided an apparatus and method for a webshop such that the products shown to a customer are related to the purchasing habits of the customer. A control unit is arranged to communicate with a product information database, a product category database and a customer purchase history database. The control unit includes a product categorising unit arranged to generate at least one product category based on product information in the product information database and to store the at least one generated product category in the product category database. A calculating unit is arranged to calculate a probability of a customer being an underbuyer/overbuyer of a type of product based on the customer's purchase history stored in the customer purchase history database and the at least one product category from the product category database.

20 Claims, 4 Drawing Sheets

(56) References Cited

U.S. PATENT DOCUMENTS

| | | | |
|---|---|---|---|
| 2015/0348069 A1* | 12/2015 | Fano | G06Q 30/0631 |
| | | | 705/7.31 |
| 2016/0012511 A1 | 1/2016 | Braziunas et al. | |
| 2016/0055416 A1 | 2/2016 | Katsuki et al. | |
| 2016/0098648 A1 | 4/2016 | Katsuki et al. | |
| 2016/0171380 A1* | 6/2016 | Kennel | G06N 7/005 |
| | | | 706/12 |
| 2017/0161757 A1* | 6/2017 | Zenor | G06Q 30/0201 |
| 2017/0372234 A1 | 12/2017 | Katsuki et al. | |
| 2018/0174212 A1* | 6/2018 | Lauka | G06Q 30/0641 |
| 2018/0357670 A1* | 12/2018 | DeLuca | G06K 9/6201 |
| 2019/0163710 A1* | 5/2019 | Haghighat Kashani | |
| | | | G06N 20/00 |
| 2019/0220779 A1 | 7/2019 | Katsuki et al. | |
| 2021/0150571 A1* | 5/2021 | Singh | G06F 16/24578 |

OTHER PUBLICATIONS

Hariharan S, "A Definitive Guide for predicting Customer Lifetime Value (CLV)" Oct. 30, 2020. Retrieved from https://www.analyticsvidhya.com/blog/2020/10/a-definitive-guide-for-predicting-customer-lifetime-value-clv/(Year: 2020).*

International Search Report (PCT/ISA/210) dated Apr. 11, 2019, by the European Patent Office as the International Searching Authority for International Application No. PCT/EP2019/053123.

Written Opinion (PCT/ISA/237) dated Apr. 11, 2019, by the European Patent Office as the International Searching Authority for International Application No. PCT/EP2019/053123.

First Office Action dated Aug. 31, 2021, by the Japanese Patent Office in corresponding Japanese Patent Application No. 2020-542874, and an English Translation of the Office Action. (10 pages).

Office Action (Examination Report No. 1) dated Apr. 13, 2021, by the Australian Patent Office in corresponding Australian Patent Application No. 2019219196. (3 pages).

Office Action (Examination Report No. 2) dated Mar. 4, 2022, by the Australian Patent Office in corresponding Australian Patent Application No. 2019219196. (4 pages).

First Office Action dated Apr. 26, 2022, by the Japanese Patent Office in corresponding Japanese Patent Application No. 2020-542874, and an English Translation of the Office Action. (8 pages).

* cited by examiner

CUSTOMER PERSONALISED CONTROL UNIT, SYSTEM AND METHOD

This application claims priority from UK Patent Application No. 1802110.5 filed 9 Feb. 2018, the content of all this application hereby being incorporated by reference.

TECHNICAL FIELD

The present invention relates generally to the field of electronic commerce and more specifically to an apparatus and method for providing a customer with a more personalised online experience.

BACKGROUND

The use of the Internet for conducting electronic commerce is well known. Many retailers now advertise and sell products online. Products of a wide variety are available for purchase online, including items which are electronically delivered to the purchaser over the Internet, for example music. Similarly, physical products, for example books, can be ordered online and delivered through conventional distribution means. Companies typically set up electronic versions of their catalogue, which are hosted on server computer systems, with lists of products available. A customer may browse through the catalogue using an Internet browser and/or a mobile application on a smart phone and select various items that are to be purchased. When the customer has completed selecting the items to be purchased, the server computer system then prompts the customer for information to complete the ordering of the items. This purchaser-specific order information may include the purchaser's name, the purchaser's credit card number, and a shipping address for the order. The server computer system then typically confirms the order by sending a confirming Web page/mobile application page to the client computer system and schedules shipment of the products.

The selection of the various items from the electronic catalogues is typically based on the model of a virtual shopping basket. When the purchaser selects an item from the electronic catalogue, the server computer system metaphorically adds that item to a virtual shopping basket. When the purchaser is done selecting items, then all the items in the shopping basket are "checked out" (i.e., ordered) at which point the purchaser provides billing and shipment information. In some models, when a purchaser selects any one item, then that item is "checked out" by automatically prompting the customer for the billing and shipment information.

It is usual to display those products of the catalogue which are most purchased by other customers more prominently in the catalogue to thereby encourage the customer currently visiting the online webshop to purchase the same product. However, although this level of personalisation tailors the display of products to the general population of customers, it does a poor job of personalising the display of products to those customers who are not interested in the products which are selected by the general population.

SUMMARY

In view of the problems in known webshops, the present invention aims to provide an apparatus and method for such a webshop such that the products shown to a customer are related to the purchasing habits of the customer.

In general terms, the invention introduces an equivalent to an ideal small town, attentive shopkeeper experience for each customer by only showing or showing first those products relevant to the customer.

According to the present invention there is provided a control unit arranged to communicate with a product information database, a product category database and a customer purchase history database. The control unit comprises a product categorising unit arranged to generate at least one product category based on product information in the product information database and to store the at least one generated product category in the product category database. The control unit further comprises a calculating unit arranged to calculate a probability of a customer being an underbuyer/overbuyer of a category of product based on the customer's purchase history stored in the customer purchase history database and the at least one product category from the product category database.

There is also provided a system comprising a product information database, a product category database, a customer purchase history database, and a control unit as previously described.

There is also provided a method of controlling a system arranged to communicate with a product information database, a product category database and a customer purchase history database. The method comprises the steps of generating at least one product category based on product information in the product information database and storing the at least one generated product category in the product category database. The method further comprises the step of calculating a probability of a customer being an underbuyer/overbuyer of a category of product based on the customer's purchase history stored in the customer purchase history database and the product category from the product category database.

BRIEF DESCRIPTION OF THE DRAWINGS

Embodiments of the invention will now be described by way of example only with reference to the accompanying drawings, in which like reference numbers designate the same or corresponding parts, and in which.

DETAILED DESCRIPTION OF EMBODIMENTS

First Embodiment

Figure 1:
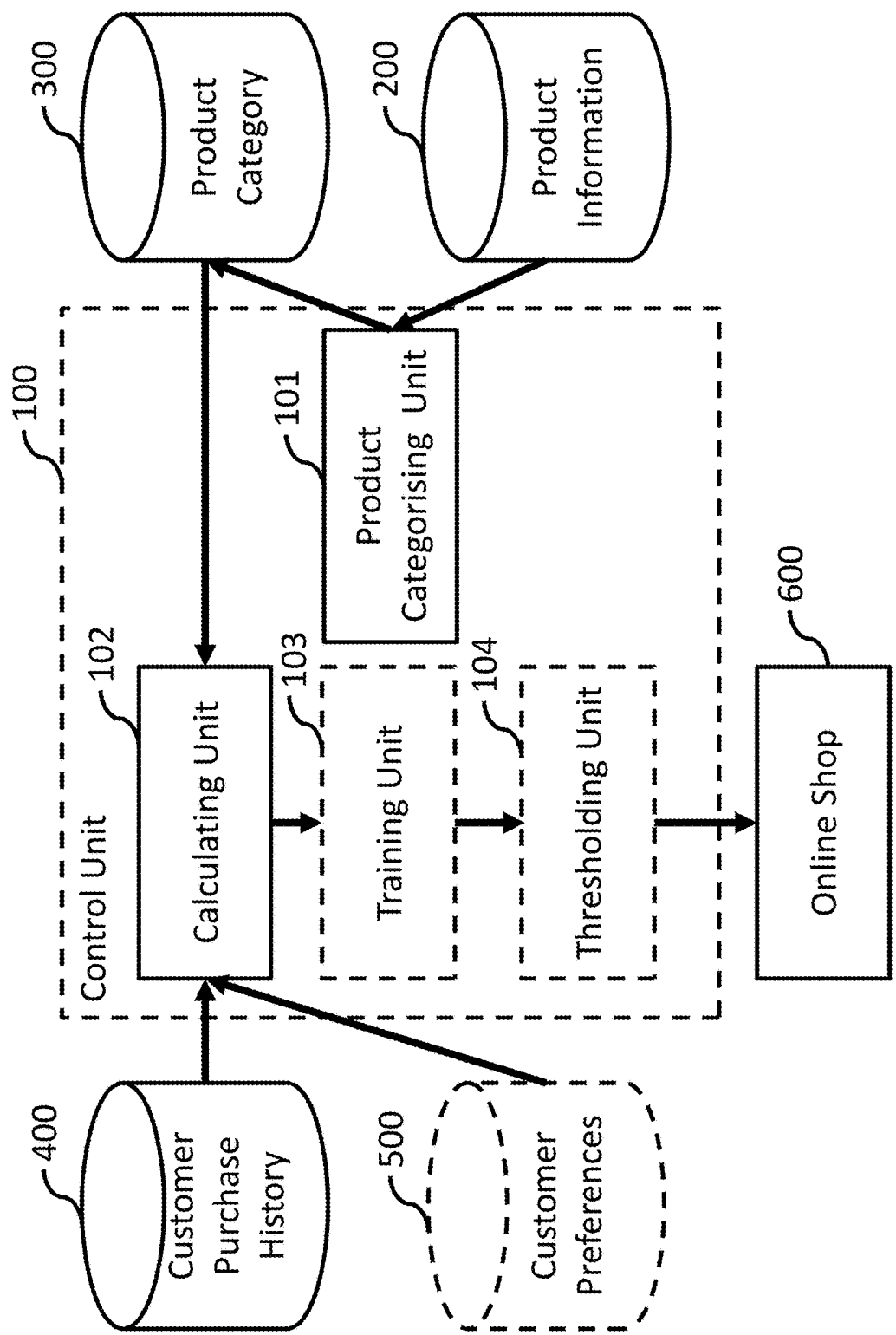
FIG. 1 is a schematic diagram of a control unit according to the first embodiment as well as components of a larger system.

FIG. 1 depicts a control unit 100 according to the first embodiment of the present invention. In this embodiment, the control unit 100 is arranged to communicate with a number of databases. More specifically, the control unit 100 is arranged to communicate with a product information database 200, a product category database 300 and a customer purchase history database 400. Optionally, the control unit 100 may be arranged to communicate with a customer preferences database 500.

The product information database 200 is arranged to store a variety of data concerning the products offered for sale in an online shop 600. For example, the product information database 200 may store at least one: product ingredients, product name, product information detailed on a label of the product, tags/information assigned to the product by a manufacturer of the product and tags/information assigned to the product by a reseller and/or distributor of the product.

For example, if the product is a food item then a list of ingredients shown on the label of the product may be stored in the database. Moreover, the manufacturer/reseller/distributor may store other information relating to the product which may or may not be shown on the label of the product and with which the product has been tagged. For example, whether the product is gluten-free, suitable for vegetarians or is kosher. As will be appreciated, a variety of other types of product information may also be stored in the product information database 200. Additionally or alternatively, the product information database 200 may store information derived from past sales, for example, average life of a product, price, velocity, performance, rating etc.

The product category database 300 stores product categories which the control unit 100 has determined from the information stored in the product information database 200. For example, the control unit may determine a number of categories to be applied to products, for example, "meat", "pet", "baby" etc. The product category database 300 therefore stores, for each product, any categories assigned to the product. As will be explained later, the control unit 100 uses the product information to determine relevant categories for the product. The present inventors envisage a number of different categories to be determined, depending on the customers and the products being sold, and depending on the reseller and/or distributor. For example, there may be further categories such as "gluten free", "organic", "meat substitute", "baby", "alcohol", "premium", "vegan" etc.

The customer purchase history database 400 is arranged to store information about each customer and the products they have purchased over a predetermined period of time. For example, the last six months' worth of purchases. As will be explained later, the history of customer purchases is used by the control unit 100 to determine a probability that the customer is an underbuyer/overbuyer of particular categories of products in the next orders relative to the general population of customers.

Optionally, a customer preferences database 500 is provided. The customer preferences database 500 is arranged to store information provided directly by the customer themselves concerning their preferred categories of products. For example, the online shop 600 may directly ask a customer a question, by way of a web page and/or a screen of a mobile application, such as asking whether the customer consumes meat. The answer provided by the customer may be stored in the customer preferences database 500 and be used by the control unit 100 to refine the probabilities calculated.

The online shop 600 provides a catalogue of products which may be selected and/or purchased by a customer visiting the online shop 600. The online shop 600 may utilise any number of different means to have the customer browse and/or purchase products. Typical examples include web pages which may be visited from web browsers on desktop/laptop computers. Moreover, the online shop 600 may provide a similar experience on mobile devices such as smartphones/tablets either by way of a web page and/or a mobile application specifically designed for the mobile device. As will be appreciated, any number of other technologies (for example, personal assistants, virtual personal assistants, voice activated devices and the like) may be utilised to allow customers to browse and/or purchase products from a catalogue.

With specific reference to the control unit 100, the control unit 100 of the first embodiment of the present invention is arranged to categorise products based on product information stored in the product information database 200. The control unit 100 is further arranged to calculate a probability as to whether a customer is an underbuyer/overbuyer of a particular category of product based on product categories together with the purchase history of the customer as stored in the customer purchase history database 400.

More specifically, the control unit 100 comprises a product categorising unit 101 and a calculating unit 102. Optionally, the control unit 100 may comprise a training unit 103 and a thresholding unit 104.

The product categorising unit 101 is arranged to receive product information from the product information database 200 and to generate at least one product category for each product based on the product information and then to store the generated at least one product category in the product category database 300. More specifically, the product categorising unit 101 may utilise at least one of: product ingredients, product name, product information detailed on a label of the product, tags/information assigned to the product by a manufacturer of the product and tags/information assigned to the product by a reseller and/or distributor of the product in determining the product category. In this regard, the present inventors have found that tags/information assigned by the manufacturer/reseller/distributor are typically not accurate enough to be used for product category. For example, the manufacturer/reseller/distributor may categorise a product as suitable for vegetarians even when the product contains meat derived gelatine product. Therefore, the present inventors have utilised the product categorising unit 101 to more accurately categorise products, for example, by including ingredients information in the category determination.

Moreover, meat products, e.g. beef steak, do not necessarily include an ingredients list because such a product is only one type of product. Accordingly, the product categorising unit 101 may utilise the name of the product in the category, for example, categorising the product as "meat". In products which comprise more than one ingredient, for example a meat pizza, the product categorising unit 101 may categorise the product as "meat" based on the ingredients which will list a meat product such as "ham" or "chicken" which the product categorising unit 101 will use as an indicator of a meat product being present and thereby categorising the product as "meat". In a further example, a product may be categorised as "meat" if it is not categorised as "pet" or "baby" and if its ingredients comprise a meat word such as "pork", "beef, "chicken" but not "chicken style".

The above-described meat words or other words indicative of each category might be explicitly provided by a human/business expert, or automatically learnt by usage of techniques such as natural language processing such as by looking at a history of categories in product categories database 300 and product information database 200 and learning which keywords are overindexing in those categories and are thus representative of the categories.

As will be appreciated, any number of categories may be used depending on the types of customers and the online shop 600 being served. In this description, "meat", "pet", "baby" categories will be used by way of example only.

Examples such as "baby" are good illustrators of the function of the product categorising unit 101. For example, baby food would not be successfully categorised as "baby" by examining the ingredients alone because none of the ingredients specifically indicate that the food is for a baby. Therefore, in one advantageous example, the product categorising unit 101 may utilise at least two types of product information stored in the product information database 200. In this example, the name of the baby food may be "Tiny Tots". The product categorising unit 101 thereby identifies words in the title of the baby food indicative of baby food, more specifically, "Tiny Tots" may be indicative of the baby category.

The present inventors have found, advantageously, that the operations performed by the product categorising unit 101 may be performed "offline", that is separately from a particular customer placing an order. In this way, irrespective of the products to be ordered by a customer, the categories in the product category database 300 can be stored without need for interaction with the customer. Moreover, once the list of categories in the product category database 300 has been formed, then the categories need not change unless the product changes or the categories change. The present inventors envisage that an online retailer would have the product categorising unit 101 perform categorisation for all of the products based on the product information stored in the product information database 200. Thereafter, the product categorising unit 101 need only re-categorise those products that change in some way, for example, changing ingredients. Moreover, the product category unit 101 would categorise new products which are recently added to the product information database 200.

The control unit 100 also comprises a calculating unit 102 arranged to use at least one category generated by the product categorising unit 101 and the customer purchase history to calculate a probability that a customer is an underbuyer/overbuyer of a category of product. Alternatively, the probability may represent that the customer is a buyer/non-buyer of a category of product. To achieve this, the calculating unit 102 may utilise a statistical probability distribution. The present inventors have found, advantageously, to calculate the probability using a Beta Negative Binomial distribution. By way of example, when determining the probability that a customer is an underbuyer of a category of product, the Beta Negative Binomial distribution is calculated based on a given prior and a number of successes (in this case, the orders without any of the product in question) and failures (orders with the product in question) in the predetermined period of customer orders stored in the customer purchase history 400 to thereby calculate a probability of no failure in the next n orders, where n is a predetermined number of future orders. Therefore, the probability is indicative of the customer underbuying the products in the next n orders. With this a range of customers with different probabilities is calculated.

Given a Prior setting for each category, and a sequence of all orders for each customer over a period p, a probability that a customer will underbuy/overbuy from each of category in the next n orders is calculated.

The terms relied upon are:
Prior which relates to the initial probabilities and learning rate. The probability of being an underbuyer/overbuyer for new customers with no order history is given by this prior. For example, initially, new customers are to be considered "meat" buyers and as the customer places more orders, if they buy meat in at least 1 in every 5 orders, then they are meat buyers.

p which is the period of time to consider as history. Important to tune so that the system does not overlearn attributes for very frequent customers and for fast changing attributes (such as "baby" category). An example could be all orders in the last 6 months.

n relates to the number of future orders to predict, for example predicting the next four orders.

The mathematics of this calculation in this example rely on P(No Buy|Prior, n) are:

Beta Negative Binomial Distribution X~BNB($\alpha,\beta,n$)

$$P(0 | \hat{\alpha}, \hat{\beta}, n) = \frac{\Gamma(n+0)}{0! \Gamma(n)} \times \frac{B(\hat{\alpha}+0, \hat{\beta}+n)}{B(\hat{\alpha}, \hat{\beta})}$$

Where $\alpha$, $\beta$ are the prior, and posteriors looking at the past orders:

$\hat{\alpha}=\alpha+\#$past No Buys, $\hat{\beta}=\beta+\#$past Buys

The present inventors have found an advantageous approach when the customer has a number of orders, m, in the predetermined number of months' worth of customer orders stored in the customer purchase history 400. In other words, m is the minimum number of orders in a predetermined period of time for the probability to be an accurate representation of the customer's purchasing preferences. Therefore, in cases where the customer does not have m orders in the predetermined period of time the customer may be considered a buyer of the category of product with the same probability as the general population of customers. In this way, new customers or customers who don't regularly order are treated as the general population when there isn't enough information to categorise the customer as an underbuyer/overbuyer.

The probability calculated is dependent on the Prior used. The Prior is the initial probability and learning rate. The probability of not buying for new customers (no history) is given by this prior. For example, initially, new customers are to be considered "meat" buyers and as customers place more orders, if the customer buys meat in at least 1 in every 5 orders, then the Prior—which sets the learning rate—will have the customer categorised as a meat buyer. In particular, by considering new customers (for example, customers with fewer than five orders) as meat buyers, because not enough information is available to ascertain whether the customer is not a meat buyer or the customer simply hasn't tried to buy meat in the online shop 600. Therefore, the initial probability of not buying must be very small. Intuitively, customers buying meat in less than 1 per 5 orders should be considered "underbuyers" which can be denoted as "Prior(1, 5)".

Figure 2:
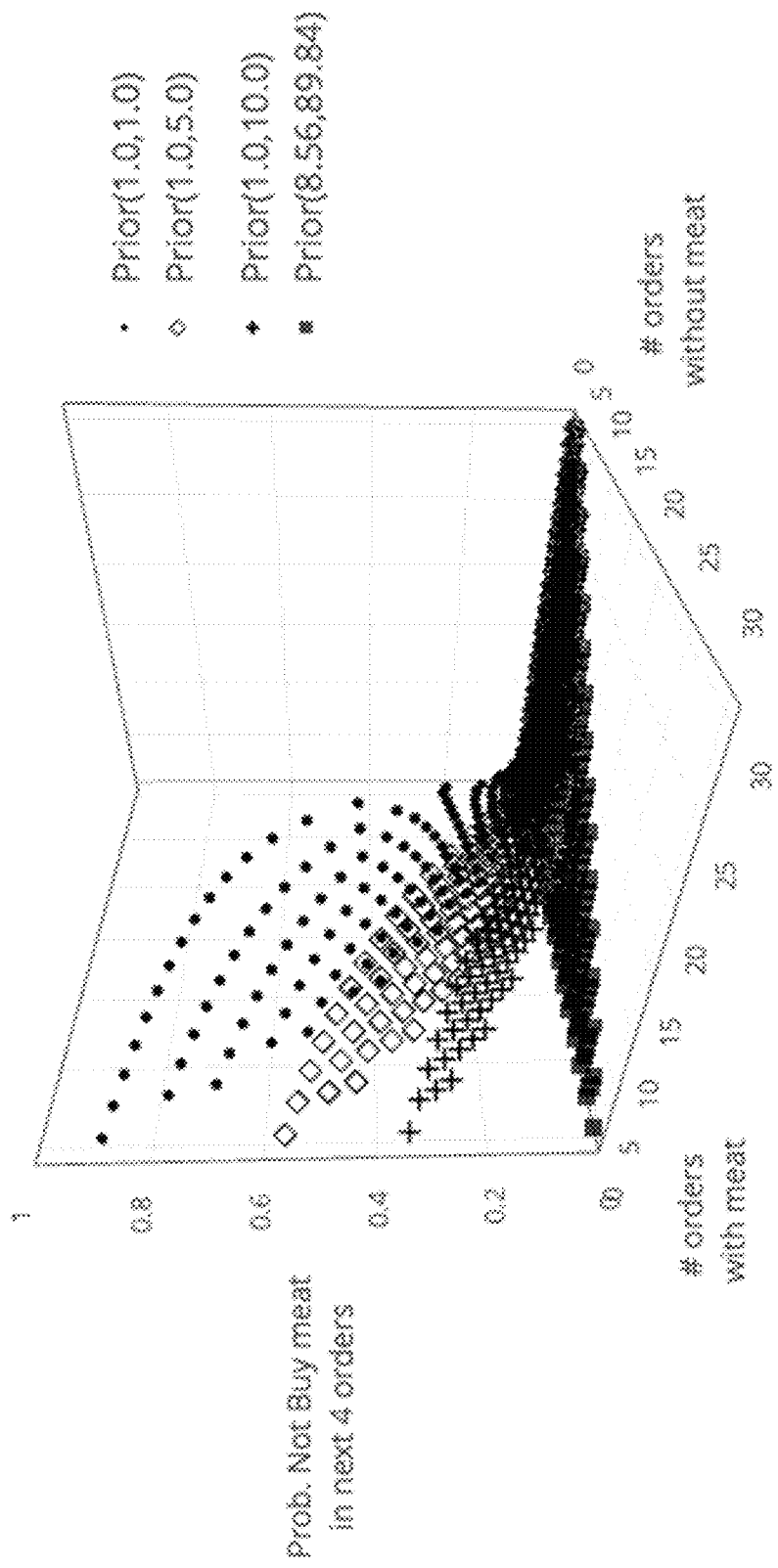
FIG. 2 is a graph showing how the selection of a Prior affects the probability calculated.

The present inventors also examined other Priors apart from Prior(1, 5) explained previously. In particular, FIG. 2 shows how the probability of not buying meat in, for example, the next four orders varies with respect to the number of orders with meat and the selected Prior. The present inventors examined different priors and found that a "Prior(1, 10)" resulted in roughly half the learning rate of "Prior(1, 5)" (~1/10 vs. ~1/5). A "Prior(1, 1)" gives an initial probability for new customers of ~50% with a fast learning rate. A "Prior(8.56, 89.84)" was tested because customer data showed that ~4% of established customers never bought meat in 6 months, as well as ~15% of new customers, therefore the estimated parameters of the model can be selected such that the probability of being an underbuyer is between 4 and 15%. However, the Prior(8.56, 89.84) has a too slow learning rate (a customer with 30 orders, all with no meat, has a probability of being an underbuyer of only ~5%) and Prior(1,1) has a faster rate (a customer with 10 orders with no meat has already ~80% probability of not buying meat on the next 4 orders). All probabilities (except the last) decrease relatively quickly when customers buy meat. Other examples of Priors are Bayes: Beta(1, 1), Jeffreys: Beta(0.5, 0.5) and Beta(1, 2).

Moreover, by relying on customer purchase history information from a predetermined period of time allows the calculated probability to react to changing customer behaviour, for example a customer labelled as an overbuyer of baby products is expected to not have always been an overbuyer of such products and as the baby grows will be expected to not remain an overbuyer.

The above calculation of probability may also include information from the customer preferences database 500 which is information provided by the customer of their particular preferences with regard to being underbuyers/overbuyers of categories of products. In this way, the customer preferences can be incorporated into the probability calculation.

The present inventors envisage that the probability may be calculated "offline", for example, one per week to accurately reflect a customer's changing purchasing habits. On the other hand, the probability may be calculated during a customer's shopping experience in the online shop 600.

Referring to FIG. 1, the control unit 100 may optionally further comprise a training unit 103. The training unit 103 is arranged to receive the calculated probability for each customer from the calculating unit 102. The training unit 103 is further arranged to train a model based on the calculated probability. In one non-limiting example, the model is a logistical regression model. Alternatively other models may be used, for example random forests. Moreover, the training unit 103 is arranged, once the model has been trained, to use the model to calculate a propensity of a customer to be an underbuyer/overbuyer of a category of product based on the calculated probability of the calculating unit 102. In this way, a wider range, between zero and one, of propensities is calculated.

Advantageously, by use of a model, more than one feature can be used as inputs to the model. For example, probability of a customer not buying a particular category of product may be one of many features input into the model, for example, the total number of orders in the customer purchase history database 400, customer information such as for how long the customer is shopping with the online shop 600, and even propensities for other attributes might be incorporated in the model. Moreover, the calculated probability for all customers is typically over a short range, through the use of the model a well distributed range of values between zero and one can be generated to give further resolution on the likely propensity of a customer to be an underbuyer/overbuyer of a category of product.

The training unit 103 may be arranged to train the model using the probability calculated for the customer, in this example, of not buying particular categories of products. To achieve this, the training unit 103 is arranged to have the calculating unit 102 calculate, given the customer purchase history over a period of time p, the probability of not buying a particular product on the following n orders after that period of time, where p and n are predetermined numbers. The actual products purchased in following n orders are then compared with the calculated probability to check if the customer bought the product. This is referred to as the ground truth, which doesn't directly relate to the truth, as customers might have bought this once or by mistake, but it relates to the actual event as it happened.

The model is then trained based on the ground truth and, in a non-limiting example, the calculated probabilities. Thereby, the model is trained to distinguish between the ground truth and the probability of a customer not buying the category of product, and optionally other features. In a further non-limiting example, different types of model are trained, with different priors, different n, and different windows of time to thereby compare the performance of each model.

In this way, the training unit 103 may be arranged to select the best model to use, where the selecting may comprise selecting the best prior, the best value of n and/or the best value for the window of time. Thereby, the training unit 103 may be arranged to select the best model automatically based on the category, and on the manufacturer's/retailer's needs.

Accordingly, the training unit 103 is arranged to, using a model and the probability of a customer being an underbuyer/overbuyer of a category of product, and optionally other features, calculate a propensity of a customer to be an underbuyer/overbuyer of a category of product.

Optionally, the control unit 100 may further comprise a thresholding unit 104 arranged to determine a threshold to be applied to the model so as to determine whether the customer is a buyer/non-buyer of a category of product.

In particular, in one non-limiting example, the thresholding unit 104 is arranged to validate the information applied to the model, and calculate, for all possible thresholds, a measure. In particular, in this example, the measure is a balance between detecting underbuyers correctly (precision) versus detecting all customers that didn't buy (recall), being the first twice more important than the second. The present inventors have found, advantageously, to use a measure named "F0.5" which is calculated as follows:

$$F_{0.5} = 1.5 \frac{\text{precision} \cdot \text{recall}}{(0.5^2 \cdot \text{precision}) + \text{recall}}$$

In one example, the best threshold separates buyers from non-buyers and is a threshold which maximises F0.5. However, other measures may be used, depending on the attribute and/or retailer and/or application.

The model trained as described above is used to automatically categorise the customers into buyers versus non buyers, based on their probabilities and optionally other features, on an independent test group of customers. And then the prediction is compared with the ground truth of that test.

The probability threshold is then automatically chosen as the one that results in the best separation of customers (best balance between precision and recall). For example, let B and NB be "Buyer" and "Non-buyer", respectively, then the threshold can be tested for the following factors:

Accuracy—overall correct predictions;
Precision—are the ones predicted as NB really NB?
Recall—can it predict all real NB?
False NB Rate—how much real B were miscategorised?
Predicted NB %—what percentage of customers are categorised as NB?

Optionally, the thresholding unit 104 may be further arranged to compare models, thresholds etc. by using the models and the calculated thresholds to thereby test the models on the test data. Thereafter, the thresholding unit 104 may be arranged to choose the model with Prior, n, time window and threshold that give the best results. Therefore, the thresholding unit 104 is arranged to determine whether a customer is buyer/non-buyer of a category of product by applying the determined threshold to the model trained in the training unit 103.

Figure 3:
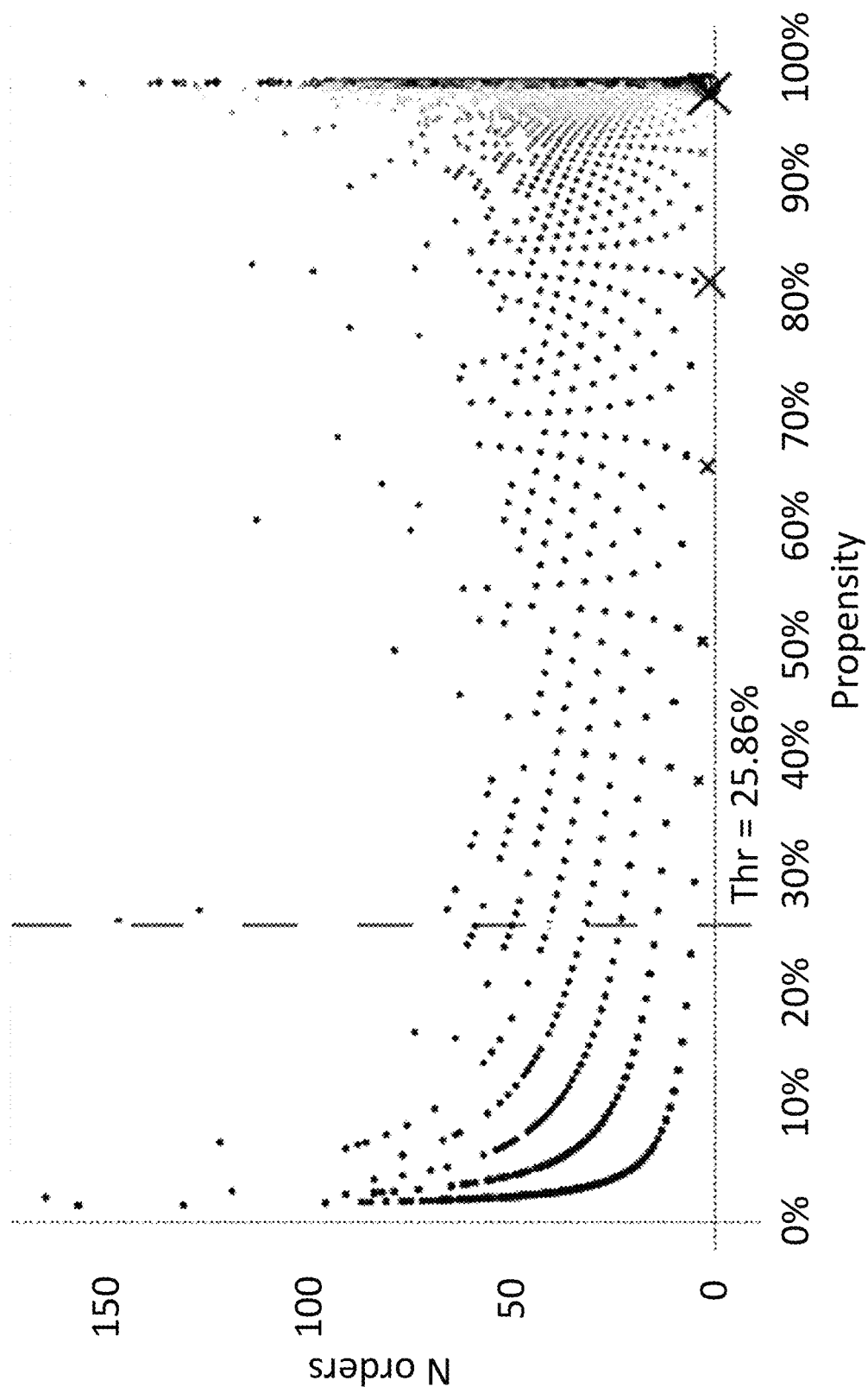
FIG. 3 is a graph showing how the propensity to order a product relates to the number of orders together with a determined threshold which is used to decide whether a customer is a buyer/non-buyer of a product.

FIG. 3 shows one example of the use of a threshold by the thresholding unit 104. The graph of FIG. 3 shows the relationship between number of orders N and propensity for a customer to buy/not buy a category of product. The example shown in FIG. 3 has been calculated with Prior(1, 1) predicting the next four orders of customers (n=4), with a minimum number of orders over the time window of 6 months (p=6 months) being six orders (m=6). The threshold determined by the thresholding unit 104 is indicated by a dashed line on the graph, at a propensity of 25.86%. Accordingly, those customers with propensities lower than this threshold are determined to be, in this example, non-buyers of meat. On the other hand, for customer with propensities greater than or equal to 25.86% are determined to be buyers of meat. As will be appreciated, the use of "meat" is an example and any of previously disclosed attributes may be used instead. Moreover, in this example, values lower than the threshold are determined to be non-buyers. As will be appreciated, for customers with propensities lower than the threshold may be determined to be buyers of a category of product. Similarly, customers with propensities greater than or equal to the threshold may instead be determined to be non-buyers of a category of product. We might also have multiple thresholds for distinguishing, for example, customers that are under buyers from expected buyers and from over buyers, depending on the business needs and decisions.

Therefore, the training unit 103 and thresholding unit 104 are optionally provided to train a model and determine an appropriate threshold of the model. Once the model has been trained the threshold determined then the training unit 103 may utilise the model to calculate a propensity of a customer to underbuy/overbuy a category of products. The threshold unit 104 may determine whether a customer is a buyer/non-buyer of a category of products. Therefore the model and threshold are typically only determined once for a category of products. The model may be used to generate customer propensities for categories of products, for example, the customer propensity may be calculated every time a customer shops at the online store 600 or may be generated automatically, offline, once per week. The threshold may then be used to separate buyers from non-buyers.

However, the model and threshold may be re-determined after a predetermined period of time (for example, after two years) to better reflect any change in purchasing habits of the general population of customers. For example, if it is known that the population are changing towards healthier food then the purchasing habits of customers may change.

Therefore, the control unit 100 provides, based on a customer's history of product purchases, together with at least one category applied to at least one product, whether the customer is likely/not likely to underbuy/overbuy that category of product. Optionally, as explained previously, the probability may be used in a model to thereby provide more resolution of the customers' purchasing habits. Optionally, the model is thresholded to provide distinct categories as to whether a customer will buy/not-buy a category of product.

An online shop 600 is arranged to receive the output of the control unit 100 and use the information to sort/add/remove products from the catalogue of products offered to the customer. For example, if the output of the control unit 100 is a thresholded result indicates that a customer is a non-buyer of meat products, then the online shop 600 may be arranged to remove or demote from the catalogue displayed to the customer those products which are and/or contain meat. Similarly, if the customer is indicated to be a buyer of meat then the online shop 600 may be arranged to add to the catalogue more meat products than would usually be shown. Similarly, if the online shop 600 receives a probability and/or a propensity of a customer to underbuy/overbuy meat products then the online shop 600 may be arranged to sort the products in the catalogue based on the probability/propensity. In this way, those customers who are more likely to buy meat products are more prominently shown meat products whilst those customers with a lower probability/propensity are less likely to be shown meat products.

Moreover, the present inventors envisage other applications for the calculated probability/propensity. For example, the probability/propensity may be used by the online shop 600 to decide which advertisements/banners should be shown to a particular customer. In this way, the customer's experience is improved because the advertisement/banners are more relevant to the customer and the effectiveness of the advertisements/banners is improved because they are more targeted. Additionally, or alternatively, the probability/propensity may be used when sending advertisement communications with promotions to customers (for example, promotion emails) because the promotions can be automatically targeted at relevant customers.

In this way, the large minority of customers who overbuy or underbuy certain categories of product than a typical customer are better served. For example, customers who do buy baby products or customers who do not buy meat. By displaying these products or media relating to these products to customers who are not interested in them, customers are alienated, wasting an opportunity to show products that are relevant, and generally failing to measure up to the ideal of a small town, attentive shopkeeper experience. Moreover, as a customer's preferences change, the above described control unit 100 is arranged to learn/unlearn, at an appropriate rate, the changing preferences of the customer.

Figure 4:
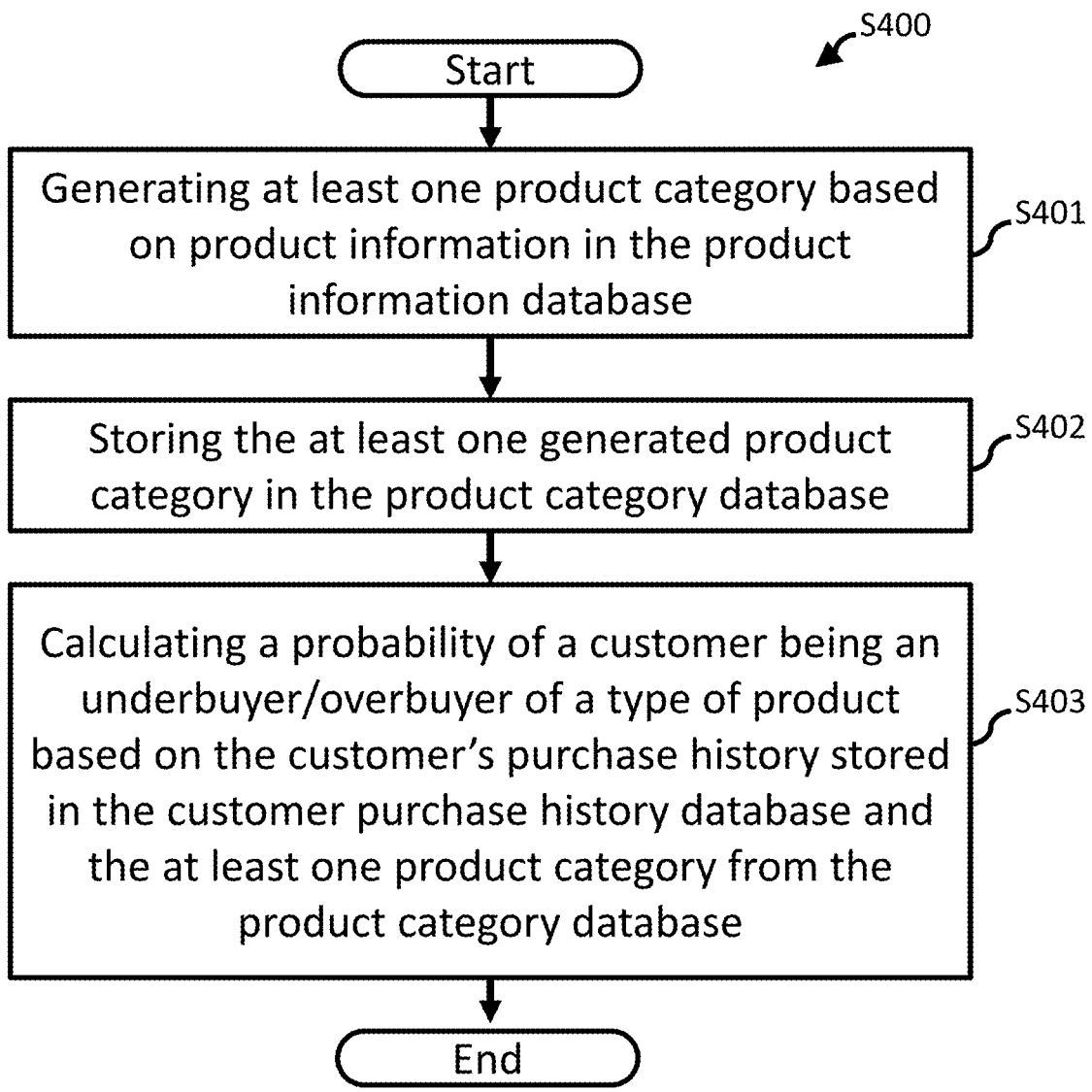
FIG. 4 is a flowchart showing the steps taken in a method of controlling a control unit according to a first embodiment of the present invention.

FIG. 4 is a flowchart of a method S400 according to the first embodiment of the present invention. The method S400 is for controlling a system arranged to communication with a product information database, a product category database and a customer purchase history database.

At step S401 the method S400 generates at least one product category based on product information in the product information database. In this regard, the step S401 is arranged to utilise product information to determine an appropriate category for the product. A range of information may be used in this determination, for example, information provided on the label of the product or in documentation provided (whether physically or electronically) along with the product. Moreover, step S401 may rely on information of a category performed by at least one of the manufacturer, reseller or distributor. For example, with regards to a bottle of whiskey, a generated category may be 'alcohol'. To generate such a category, step S401 may rely on the ingredients listed on the bottle which may indicate the alcoholic content of the whiskey bottle. Additionally or alternatively the name of the product on the label may be indicative of a well-known brand of whiskey and therefore the product can be categorised based on the name of the product alone. Additionally or alternatively, the manufacturer/reseller/distributor may include a datasheet along with the whiskey bottle indicating its alcoholic nature and thereby may be used to categorise the product. As will be appreciated 'alcohol' may be one of many different categories to be used with products to be categorised.

At step S402, the at least one generated product category is stored in the product category database. In this step the categories of the product are stored in the product category database 300 along with an indication of the product for cross-reference with the products purchased by a customer and recorded in the customer purchase history database 400. In this way, the categories of products purchased by a customer over a predetermined period of time can be ascertained based on the categories stored in the product category database 300.

At step S403, a probability of a customer being an underbuyer/overbuyer of a category of product is calculated. The probability is calculated based on the customer's purchase history stored in the customer purchase history database and the product category from the product category database. This step S403 calculates the probability of a customer being an underbuyer/overbuyer of a category of product by cross-referencing the products purchased by the customer over a predetermined period of time with the category of that product as stored in the product category database 300. More specifically, the step S403 may utilise a probability distribution such as the Beta Negative Binomial distribution to thereby calculate the probability of the customer being an underbuyer/overbuyer of a category of product. Moreover, the calculation of the probability is performed for each category utilised by the method, for example, if the categories "alcohol", "baby" and "meat" are used to categorise a customer, then the customer's purchase history is used, for each category to ascertain whether the customer is an underbuyer/overbuyer of each of categories of products indicated by "alcohol", "baby" and "meat".

The calculation of the probability depends on a selected prior and information from the customer purchase history regarding the number of times an order is placed for a product in the category and the number of times an order is placed without a product in the category. The probability is calculated as prediction of the next predetermined number of orders, for example, for the next four orders. A new customer will not have a sufficient order history to provide accurate probability results, therefore the present inventors envisage setting the probability for newer customers without a minimum number of orders to a level of underbuyer/overbuyer in accordance with the usual probability for the general population of customers.

Optionally, the method S400 may further comprise a step of communicating with a customer preferences database 500 and calculating the probability based on the customer's purchase history stored in the customer purchase history database, the customer's product preferences stored in the customer preferences database and the product category from the product category database. In this way, customer preferences set explicitly by the customer are used in the calculation of the probability.

Optionally, the method S400 may further comprise a training step wherein a model is trained based on the calculated probability. For example, the model may be a logistical regression model which is used because it generates a more even distribution between zero and one of a customer's propensity to purchase a particular category of product. Moreover, other factors can be utilised in the model beyond the probability of a customer being an underbuyer/overbuyer. Moreover, the training step may further comprise calculating a propensity that a customer is an underbuyer/overbuyer of a category of product based on the trained model and the calculated probability.

Optionally, the method S400 may further comprise a thresholding step arranged to determine a threshold to be applied to the model to determine whether the customer is an underbuyer/overbuyer and/or a buyer/non-buyer of a category of product. In this way, by having the thresholding step apply the threshold to the model a distinct category can be applied to the customer which may be useful in a webshop 600 to choose whether to include/exclude products from display in a catalogue of products.

Based on at least one of the probability/propensity of a customer to be an underbuyer/overbuyer of a category of product and/or whether the customer is a buyer/non-buyer of a category of product the online shop 600 may be arranged to add/remove/sort the products for display to the customer.

Modifications and Variations

Many modifications and variations can be made to the embodiments described above, without departing from the scope of the present invention.

Although the first embodiment has been provided with a product category database 300, such a feature is not always necessary. Instead, the control unit 100 may comprise a storage unit arranged to store product categories based on product information. In this way, storage in a device external to the control unit 100 is avoided. Instead, the product categorising unit 101 may be arranged to categorise products based on the product information stored in the product information database 200 and to communicate the product categories to the calculating unit 102 directly.

Moreover, in a non-limiting example, the control unit 100 may further comprise a refining unit. The refining unit is arranged to refine the list of product to be categorised by the product categorising unit 101 using the information in the customer purchase history database 400. In particular, the present inventors have found that products bought in the same proportion by both underbuyers/non-buyers and overbuyers/buyers are best excluded from categorisation by the product categorising unit 101. For example, the present inventors have found that underbuyers and overbuyers of products categorised as 'meat substitute' are equally likely to purchase a product 'miso soup' (where the product 'miso soup' is likely categorised as 'meat substitute'). Similarly, a product 'yoghurt' (likely to be categorised as 'organic') was equally likely to be purchased by underbuyers and overbuyers of products categorised as 'organic'. Similarly, a product 'baby wipes' (likely to be categorised as 'baby') are bought by all customers, not just those who are overbuyers for the category 'baby'.

Moreover, the control unit 100 may further comprise a correlating unit arranged to correlate products. For example, given some products with a particular category, the correlating unit is arranged to find other products which overbuyers of the particular category buy and which underbuyers of the particular category do not buy, and add the other products to the category.

For example, a product 'tofu' may not be categorised as 'meat substitute'. However, the correlating unit may utilise customer purchase history stored in the customer purchase history database 400 to identify whether the proportion of customers who have relatively high probability/propensity (and therefore are overbuyers) of 'meat substitute' products also purchase 'tofu' with a probability/propensity substantially higher than the proportion of underbuyers purchasing 'tofu'. In this example, 'meat substitute' products correlate with the product 'tofu' because overbuyers of 'meat substitute' products also purchase 'tofu'. Therefore the correlating unit is arranged to add the product 'tofu' to the 'meat substitute' category.

Advantageously, the actions of the refining unit and the correlating unit may be performed offline and only performed once for a particular manufacturer/retailer.

Additionally, the present inventors envisage that real-time calculation of categories may be advantageous. For example, with short lived categories of a customer's probability/propensity to be an underbuyer/overbuyer short periods of being an underbuyer/overbuyer may be recognised. For example, a customer indicated to be an underbuyer of baby products may be shopping for a baby shower gift. Therefore, the first embodiment is envisaged to be modified to notice the otherwise abnormal shopping behaviour (for example searching for baby products) and for the duration of that shopping session to treat that customer, at least to some extent, as if they were an overbuyer of baby products.

Additionally or alternatively, the above described first embodiment may use 'embeddings' (also referred to as 'word embeddings') to determine the similarity of products. In this regard, 'embeddings' may be, in this context, referred to as 'product embeddings'. A product embedding assigns, to every product, a mathematical vector of a predetermined length, for example, a cucumber may be represented as [1.0, −0.9, 7.0], i.e. a vector of real numbers. Such a representation has many advantages, especially when used with machine learning. In particular, product embeddings allows for easier definitions of similar and complementary products to help better discover relationships between products. Moreover, it permits the discovery of patterns in customer behaviours, and understand customer shopping basket content. In this way, a product is mathematically embedded from a space with one dimension per product to a continuous vector space with a lower dimension.

In particular, the product categorising unit may be arranged to determine at least one similarity between information about a product stored in a product information database and information about at least one other product stored in the product information database based on product embeddings. For example, each product may be assigned a mathematical vector (the mathematical vector being stored in the product information database) and similarities between products determined based on the stored mathematical vectors. In this way, products can be grouped into categories based on the product embedding.

Examples of software which may be used with regards to product embeddings are "word2vec" and/or "doc2vec". Word2vec provides efficient estimation of work representations in vector space whilst doc2vec provides distributed representations of sentences and documents.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

1. A control unit arranged to communicate with a product information database, a product category database and a customer purchase history database, the control unit comprising:
   a product categorising unit configured and arranged to generate at least one product category based on product information from the product information database and to store the at least one generated product category in the product category database;
   a calculating unit configured and arranged to calculate a probability of a customer being an underbuyer/overbuyer of a category of product based on a customer's purchase history stored in the customer purchase history database and the at least one product category from the product category database; and
   a training unit configured and arranged to:
      train a model with plural parameters which set at least a learning rate of each model, the trained model distinguishing between a ground truth of a customer's purchase history and the calculated probability;
      calculate a propensity of a customer to be an underbuyer/overbuyer of the at least one product category based on the trained model; and
      generate a signal that arranges the electronic display of products in the at least one product category based on the calculated propensity.

2. The control unit according to claim 1, wherein the product categorising unit is configured and arranged to generate at least one product category based on at least one or more of the following stored in the product information database:
   product ingredients;
   product name;
   product information detailed on a label of the product;
   information about the product provided by a manufacturer of the product; or
   information about the product provided by a reseller and/or distributor of the product.

3. The control unit according to claim 1, in combination with a customer purchase history database configured and arranged to store a purchase history of a customer over a predetermined period of time.

4. The control unit according to claim 1, wherein the control unit is configured and arranged in combination with a customer preferences database to communicate therewith, and the calculating unit is configured and arranged to calculate a probability of a customer being an underbuyer/overbuyer of a product based on a customer's purchase history stored in the customer purchase history database, the customer's preferences stored in a customer preferences database and at least one product category from a product category database.

5. The control unit according to claim 1, wherein the calculating unit is configured and arranged to calculate the probability using a Beta Negative Binomial distribution based on a predetermined prior and a number of successes and failures in predicting a customer's behaviour over a predetermined period of time.

6. The control unit according to claim 1, wherein the calculated probability is arranged to predict a customer behaviour for a predetermined period of time.

7. The control unit according to claim 1, wherein the model is a logistical regression model.

8. The control unit according to claim 1, wherein the control unit comprises:
   a thresholding unit configured and arranged to determine a threshold to be applied to the model, and configured and arranged to determine whether the customer is a buyer/non-buyer of a category of product based on the threshold and the model.

9. A system comprising, in combination:
   a product information database;
   a product category database;
   a customer purchase history database; and
   a control unit arranged to communicate with the product information database, the product category database and the customer purchase history database, the control unit having:

a product categorising unit configured and arranged to generate at least one product category based on product information from the product information database and to store the at least one generated product category in the product category database; and a calculating unit configured and arranged to calculate a probability of a customer being an underbuyer/overbuyer of a category of product based on a customer's purchase history stored in the customer purchase history database and the at least one product category from the product category database; and a training unit configured and arranged to:
train a model with plural parameters which set at least a learning rate of the model, the trained model distinguishing between a ground truth of a customer's purchase history and the calculated probability;

calculate a propensity of a customer to be an underbuyer/overbuyer of the at least one product category based on the trained model; and generate a signal that arranges the electronic display of products in the at least one product category based on the calculated propensity.

10. The system according to claim 9, comprising:
a customer preferences database,
wherein the control unit is configured and arranged to communicate with the customer preferences database, and the calculating unit is configured and arranged to calculate a probability of a customer being an underbuyer/overbuyer of a product based on a customer's purchase history stored in the customer purchase history database, the customer's preferences stored in the customer preferences database and the at least one product category from the product category database.

11. The system according to claim 9, comprising:
an online shop arranged to add/remove/sort products for a customer based on an output of the control unit.

12. A method of controlling a system arranged to communicate with a product information database, a product category database and a customer purchase history database, the method comprising:
generating at least one product category based on product information in the product information database;
storing the at least one generated product category in the product category database;
calculating a probability of a customer being an underbuyer/overbuyer of a category of product based on the customer's purchase history stored in the customer purchase history database and the at least one product category from the product category database;
training a model with plural parameters which set at least a learning rate of the model, the trained model distinguishing between a ground truth of a customer's purchase history and the calculated probability;
calculating a propensity of a customer to be an underbuyer/overbuyer of the at least one product category based on the trained model; and
generating a signal that arranges the electronic display of products in the at least one product category based on the calculated propensity.

13. The method according to claim 12, wherein the generating is performed based on at least one or more of the following stored in the product information database:
product ingredients;
product name;
product information detailed on a label of the product;
information about the product provided by a manufacturer of the product; or
information about the product provided by a reseller and/or distributor of the product.

14. The method according to claim 12, comprising:
storing in the customer purchase history database a purchase history of a customer over a predetermined period of time.

15. The method according to claim 12, wherein the method comprises:
communicating with a customer preferences database; and
calculating a probability of a customer being an underbuyer/overbuyer of a category of product based on the customer's purchase history stored in the customer purchase history database, the customer's preferences stored in the customer preferences database and the at least one product category from the product category database.

16. The method according to claim 12, wherein the method comprises:
calculating the probability using a Beta Negative Binomial distribution based on a predetermined prior and a number of successes and failures in predicting a customer's behaviour over a predetermined period of time.

17. The method according to claim 12, wherein the calculated probability is arranged to predict a customer behaviour for a predetermined period of time.

18. The method according to claim 12, wherein the model is a logistical regression model.

19. The method according to claim 12, wherein the method comprises:
determining a threshold to be applied to the model; and
determining whether the customer is a buyer/non-buyer of a category of product based on the threshold and the model.

20. The method according to claim 12, comprising:
adding/removing/sorting products for a customer, in an online shop, based on the output of the control unit.

* * * * *